United States Patent [19]

Sako et al.

[11] Patent Number: 4,539,563

[45] Date of Patent: Sep. 3, 1985

[54] METHOD AND APPARATUS FOR DRAWING LINES

[75] Inventors: Kazuaki Sako, Ibaraki; Kenjiro Mori, Yokohama, both of Japan

[73] Assignee: Hitachi, Ltd., Tokyo, Japan

[21] Appl. No.: 375,589

[22] Filed: May 6, 1982

[30] Foreign Application Priority Data

May 11, 1981 [JP] Japan .................. 56-69445

[51] Int. Cl.³ .............................................. G09G 1/00
[52] U.S. Cl. .................................... 340/735; 340/709
[58] Field of Search ................. 340/735, 736, 739, 709

[56] References Cited

U.S. PATENT DOCUMENTS

| | | | |
|---|---|---|---|
| 3,471,848 | 10/1969 | Manber | 340/750 |
| 3,911,419 | 10/1975 | Bates | 340/709 |
| 4,148,014 | 4/1979 | Burson | 340/709 |
| 4,291,305 | 9/1981 | Kimura | 340/734 |
| 4,331,955 | 5/1982 | Hansen | 340/739 X |

Primary Examiner—Marshall M. Curtis
Assistant Examiner—Vincent P. Kovalick
Attorney, Agent, or Firm—Antonelli, Terry & Wands

[57] ABSTRACT

A line drawing method for display apparatus having memory means for storing line information including the start point and end point of any line which has been displayed on the display screen, comprising the steps of entering start point data and a line drawing instruction for a line to be displayed on the display screen, determining the end point of the line to be displayed in accordance with the entered information and stored line information, generating line information based on said determination, storing the generated information in the memory means, and displaying the generated information on the display screen.

7 Claims, 11 Drawing Figures

LINE PATTERN    CHARACTER PATTERN
ADDRESS DATA    ADDRESS DATA

FIG. 4d
① | 1 | 0 | 0 | 0 | CHARACTER PATTERN ADDRESS DATA |
② | 1 | 0 | 0 | 1 |
③ | 1 | 0 | 1 | 0 |
④ | 1 | 0 | 1 | 1 |
⑤ | 1 | 1 | 0 | 0 |
⑥ | 1 | 1 | 0 | 1 |
⑦ | 1 | 1 | 1 | 0 |
⑧ | 1 | 1 | 1 | 1 |

FIG. 5A

CONTROL TABLE

| | RS | RE | CS | CE | DS | M |
|---|---|---|---|---|---|---|
| | 01H | 05H | 02H | 04H | 0FFH | 05H |

FIG. 5B

DATA TABLE

| | | | | | | |
|---|---|---|---|---|---|---|
| 01H | 0FFH | 05H | 1 | 10 | 1 | 70 |
| 02H | 0FFH | 03H | 2 | 10 | 2 | 70 |
| 03H | 02H | 04H | 1 | 10 | 20 | 10 |
| 04H | 04H | 0FFH | 20 | 10 | 20 | 10 |
| 05H | 01H | 0FFH | 1 | 70 | 20 | 70 |
| | | | | | | |
| L | FR | BR | SY | SX | EY | EX |

METHOD AND APPARATUS FOR DRAWING LINES

BACKGROUND OF THE INVENTION

1. Field of the Invention

The present invention relates to method and apparatus for drawing lines on a display screen.

2. Description of the Prior Art

There has previously been devised a method for drawing lines on a display screen such as a CRT screen, in which the starting point and ending point of a line are specified by using a cursor or a cursor is moved so that the locus of the cursor turns into a line. Any of these conventional methods, however, requires a considerably long cursor moving distance, resulting disadvantageously in a time loss in operation.

SUMMARY OF THE INVENTION

It is an object of the present invention to provide a method and apparatus for drawing lines on a display screen with less cursor moving distance to thereby minimize the time for the drawing operation.

In order to achieve the above object, the present invention provides memory means for storing line information including starting points and ending points for lines displayed on a screen, and means for setting on the screen the starting point of a line to be displayed and determining the ending point of the line based on the line information of displayed lines stored in the memory means and the setting of the starting point, thereby producing line information of the line to be displayed, and storing it in the memory means, while displaying the line on the screen.

BRIEF DESCRIPTION OF THE DRAWINGS

FIGS. 4a to 4d and FIGS. 5 to 7 are diagrams useful for explaining the process carried out by the apparatus according to the present invention, wherein FIGS. 4a to 4b are diagrams illustrating in detail the line patterns, FIG. 5A is a diagram illustrating in detail the form of the control table arranged in the memory unit illustrated in FIG. 2 and FIG. 5B is a diagram illustrating in detail the form. a data table arranged in the memory unit illustrated in FIG. 2, and FIGS. 6 and 7 are diagram illustrated the generation of the line tables of FIG. 5 by the process illustrated in FIG. 3.

DESCRIPTION OF THE PREFERRED EMBODIMENTS

The present invention is described in detail in terms of a preferred embodiment.

Figure 1:
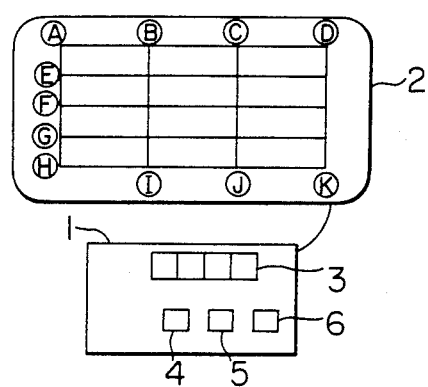
FIG. 1 is an external view of a line drawing apparatus according to the present invention.

FIG. 1 illustrates an external view of the line drawing apparatus according to the present invention, wherein the apparatus includes a keyboard 1 and a CRT display 2. The keyboard 1 includes a cursor move key 3, a vertical line drawing instruction key 4, a horizontal line drawing instruction key 5, and a line cancelling instruction key 6.

The following will describe the key operating procedures for displaying a format or table shown in FIG. 1 on the display screen 2. An assumption is made here that the cursor move key 3, line drawing instruction keys 4 and 5, and line cancelling instruction key 6 on the keyboard 1 are used in this operation, and cancellation of lines is carried out by pressing the line cancelling instruction key 6 and the line drawing instruction key 4 or 5 simultaneously. The functions of the keys 3 to 6 may be achieved by use of alpha-numeric keys instead of providing such special keys.

First, the cursor is set at point A on the CRT display 2 where the line to be displayed should start, and the vertical and horizontal line drawing instruction keys 4 and 5 are pressed. Since the line ending point is not given, lines are drawn over point D to the rightmost end of the screen and over point H to the bottom of the screen. Next, the cursor is set at point B and the vertical line drawing instruction key 4 is pressed. Next, the cursor is set at point C and the key 4 is pressed. Further, the cursor is set at point D and the vertical line drawing instruction key 4 is pressed. Subsequently, the line cancelling key 6 and horizontal line drawing instruction key 5 are pressed simultaneously so that the excessive portion of the horizontal line on the right side of the point D is deleted. At this time, the vertical lines starting from the points B, C and D are displayed as extending down to the bottom of the screen as in the case of the first vertical line. Next, the cursor is set at points E, F, G and H sequentially and the horizontal line drawing instruction key 5 is pressed each time. In this case, the end points of these lines are determined in a manner as mentioned hereinafter by the vertical line starting from the point D. Finally, the cursor is set at points H, I, J and K sequentially and each time the line cancelling instruction key 6 and vertical line drawing instruction key 5 are pressed simultaneously. Thus the table of FIG. 1 is completed on the screen.

An alternative operating procedure for displaying the same table is that the outer frame of the table is first displayed by setting the points A, D, H and K, then the vertical and horizontal lines are drawn by setting the points B, C, E, F and G. In this case, deletion of excessive line portions by setting the points I and J can be omitted.

Figure 2:
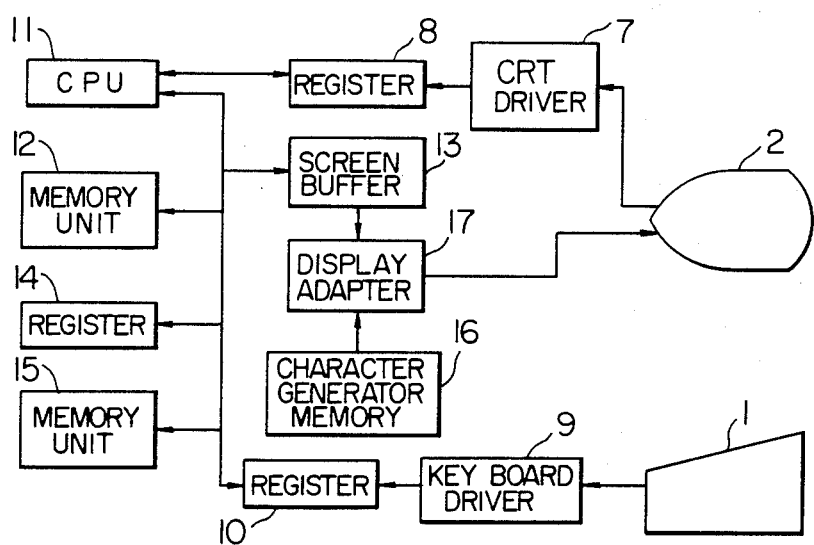
FIG. 2 is a block diagram showing an electrical circuit of a line drawing apparatus embodying the present invention.

FIG. 2 is a block diagram showing the line drawing apparatus according to the present invention. In this arrangement, the cursor is moved to the line starting point by pressing the cursor move key 3 on the keyboard 1. The cursor positional information is stored in the register 8 as obtained from the CRT driver 7. Subsequently, when the line drawing instruction key 4 or 5, or the line cancelling instruction key 6 is pressed, the keyboard driver 9 generates a code, and it is stored in the register 10. The CPU 11 initiates the program stored in the memory unit 12 in accordance with the code in the register 10. The program first converts the cursor position stored in the register 8 into positional data for the screen buffer 13 which is partitioned into numerous columns and rows, and stores the converted data in the register 14 as the line start positional data. If the line drawing instruction key 4 or 5 has been pressed, the program makes reference to the line table in the memory unit 15 containing the existing line information (including line starting points and ending points for lines which have been drawn and will be termed "line data" hereafter). The ending point is determined by using horizontal line data if the vertical line drawing instruction key is pressed or by using vertical line data if the horizontal line drawing instruction key is pressed. The resultant end point is then stored in the register 14. The program stores addresses of the character generator (CG) memory 16 containing intended display patterns in the locations of the screen buffer 13 corresponding to the line portions from the drawing start row or column to the drawing end row or column displayed on the display screen 2. The display adaptor 17 reads out display patterns stored in the CG memory 16 in accordance with addresses stored in respective locations of the screen buffer 13, and displays lines on the CRT display 2. The program updates the line table by adding line data stored in the register 14 into the line table in the memory unit 15.

Figure 4A:
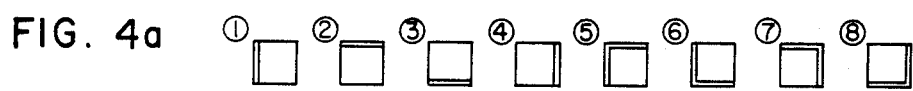
Figure 4B:
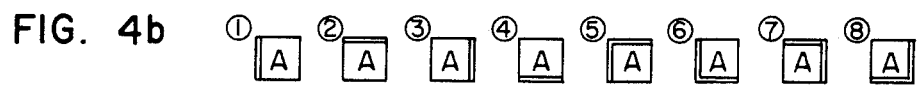
Figure 4C:
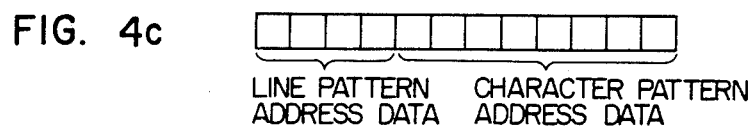

FIG. 4a shows an example of a pattern set for displaying lines including eight patterns. A line pattern and a character pattern can be displayed simultaneously as shown in FIG. 4b by drawing the line pattern data and character pattern data into the screen buffer 13 at the same time. In this case, the CG address is formatted as shown in FIG. 4c.

FIG. 4d exemplifies the CG address, which starts with "1" when the line pattern data is included or starts with "0" when only the character pattern data is included. Data 1 to 8 shown in FIG. 4d correspond to display 1 to 8 in FIG. 4b where line patterns and character patterns are displayed at the same time. Thus, by storing both line pattern address data and character pattern address data in the same location, a line pattern and a character pattern can be displayed simultaneously.

Figure 3:
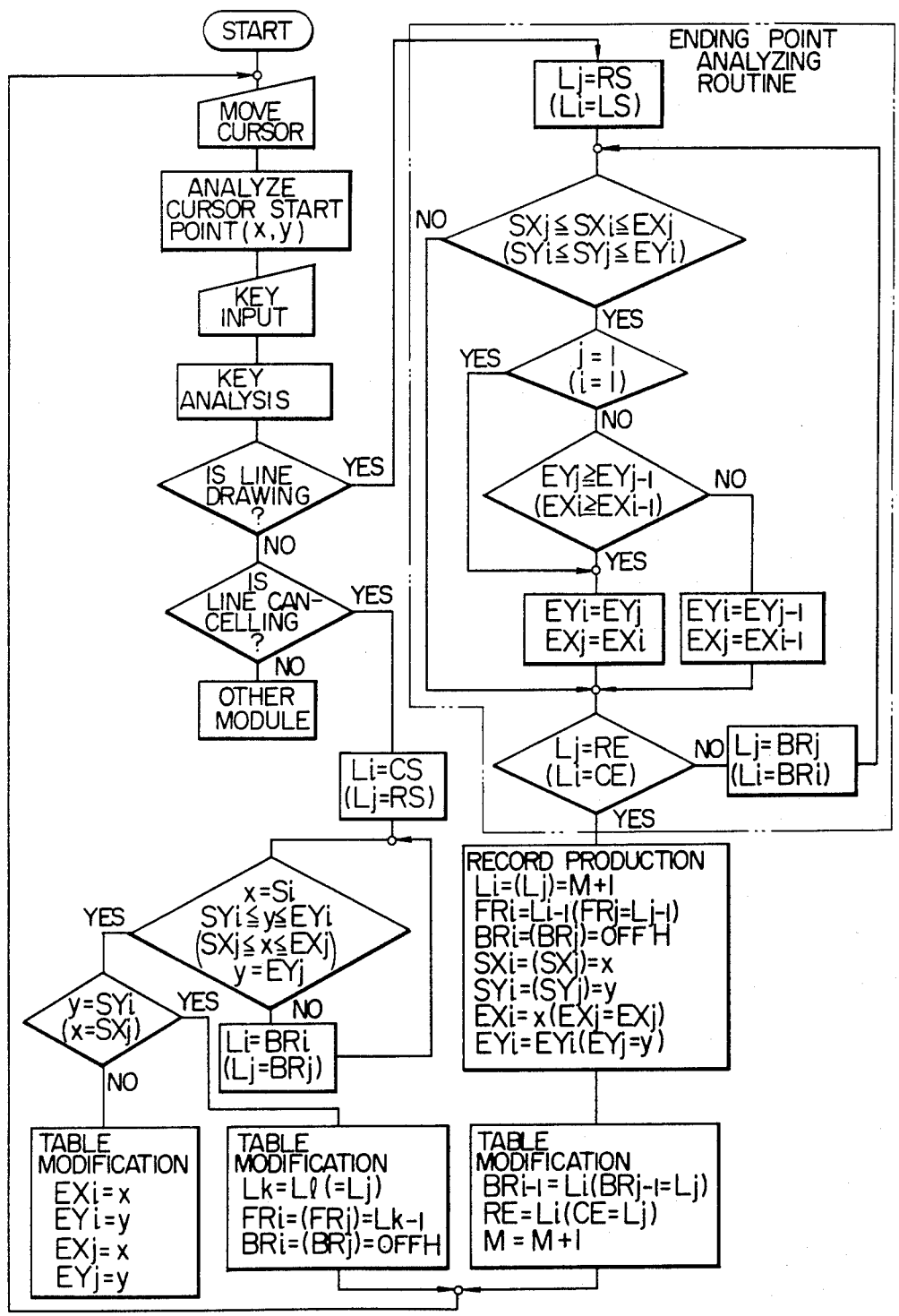
FIG. 3 is a flowchart showing in detail the program processed by the CPU shown in FIG. 2.

FIG. 3 is a flowchart showing, as an example, the end point analysis and line table updating carried out by the CPU 11 in FIG. 2 in accordance with the program.

First, a position on the screen set by moving the cursor is evaluated as line drawing start row and column (x, y) in the screen buffer. Next, a key input on the keyboard 1 is decoded, and if it is the vertical line drawing instruction or horizontal line drawing instruction, the program proceeds to the end point analyzing routine. The following will describe the end point analyzing routine. Since the operations for vertical line drawing and horizontal line drawing are basically the same, the end point analysis for a vertical line will be described as an example.

First, the horizontal record number Lj is set to the horizontal line head record number RS. If starting column Sxi for the vertical line to be drawn is located between starting column Sxj and ending column Exj for the line data of the horizontal record with record number Lj, ending row EYj for the line data of the horizontal record with record number Lj is determined temporarily to be EYi. If the horizontal record number Lj is equal to vertical line tail record number RE, line data is arranged by using the temporary ending row EYi as the true vertical ending row, while if they are not equal, the record number Lj is set to the next record number BRj in order to make reference to line data for the next horizontal record. These operations are repeated, and if a new temporary end point row for the vertical line EYi is located farther away from the starting point than the previous vertical line ending row the vertical line ending row EYi is replaced by the new end point row, while if the latter is farther than the former, the latter is not renewed. This operation is repeated to determine the true vertical line ending row when the horizontal record number Lj coincides with the horizontal line tail record number RE. Thus, the line data is formed by using the vertical line ending row EYi for the end point of the vertical line to be displayed. In drawing a vertical line, the starting column and the ending column have the same value. In this embodiment, the line table is provided separately for the horizontal line record and vertical line record in order to speed up the referencing of records in analyzing the end point. However, they may be considered as one set of records.

FIGS. 5A and 5B illustrate an example of the line table used in the foregoing embodiment. The table includes a control table illustrated in FIG. 5A for controlling line records and a data table illustrated in FIG. 5B which is a set of line records. The control table controls separately vertical records and horizontal records stored in the data table. The table includes a horizontal line head record number RS which is the serial number of the first horizontal line record, horizontal line tail record number RE which is the serial number of the last current horizontal line record, vertical line head record number CS which is the first serial number of the first vertical line record, vertical line tail record number CE which is the serial number of the last current horizontal line record, maximum stored record number M, and cancelled record head number DS used for controlling cancelled records and storing additional records in the cancellation record area when the line record area becomes full. The data table stores line data including starting row SY, starting column SX, ending row EY, and ending column EX and a line record including former record number FR, next record number BR and record number L for identification of each record.

When the end point analysis has completed, the end point data are added to the line table, and the program preceeds to the operation for updating the line table. This operation will be described with reference to FIG. 6.

Figure 6:
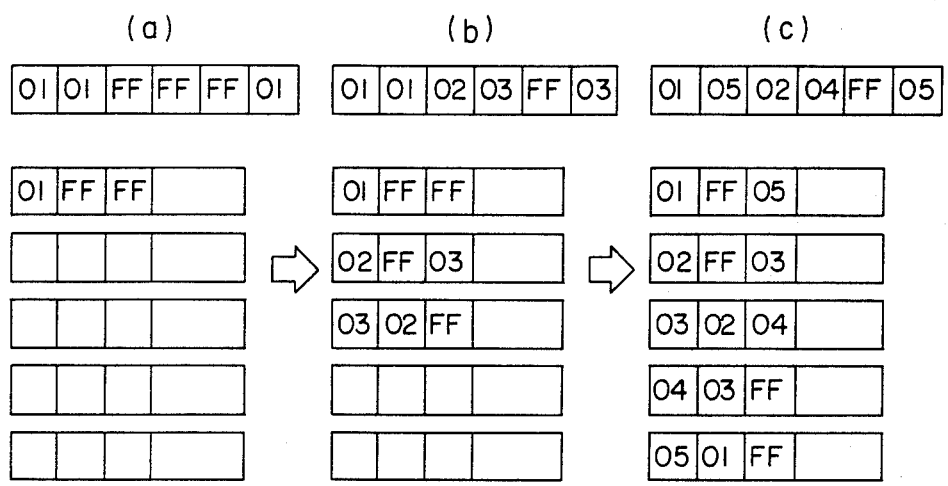

FIG. 6 illustrates the generation, addition and updating of the line table. Here, the generation of a line table by storing data in the order of a horizontal line, a vertical line, a vertical line, a vertical line, and a horizontal line in the memory unit 15 will be described as an example in the order of (a), (b) and (c) of FIG. 6. It should be noted in FIGS. 6(a) to 6(c) that the upper table is the control table and the lower table is the data table.

First, the horizontal line record is stored as shown in FIG. 6(a). Each record is designated by a record number L in the order of storing, and thus the first record is given as record number 01. There is no preceding record in this case, and the former record number FR is set to the initial value of FF (hexadecimal number). Since no next record is stored, the next record number BR is set to the initial value FF. For the control table, the horizontal line head record number RS, tail record number RE and maximum stored record number M are each set to 01 so as to indicate that the data table contains only one horizontal line record, and remaining fields are initialized to FF. Subsequently, vertical line records are stored in the data table as shown in FIG. 5(b). When the first vertical line record is stored, this is the first entry for vertical lines and there are no preceding record and following record. Thus the former record number FR and next record number BR are initialized to FF. The maximum recorded number M in the control table indicates that the data table stores a record with record number 01 at this time, and therefore the vertical record is stored in the location with record number 02 in the data table. Then the vertical line head record number CS and tail record number CE are updated from FF to 02, and the maximum stored record number M is updated from 01 to 02. When the second vertical line record is added, the control table is referenced and the vertical line tail record number CE, i.e. 02 in this case, is set to the former record number FR. The maximum stored record number M is now 02, and the additional record is stored in the location with record number 03 in the data table and the maximum stored record number M is updated from 02 to 03. The additional record is not followed by another record, and its next record number BR is set to the initial value FF. For the vertical line record with record number 02, another vertical line record with record number 03 has been added, and therefore its next record number BR is updated from the initial value FF to 03. The vertical line tail record number CE in the control table is also updated from 02 to 03. When another vertical line record is further added, the former record number is set to the maximum record number among vertical line records which have been stored, i.e. vertical line tail record number 03 in the control table, and the next record number BR is set to the initial value FF as shown in FIG. 6(c). For the preceding record with record number 03, the following vertical line record has been stored in the location with record number 04, and thus the next record number BR is updated from FF to 04. For the control table, the vertical line tail record number CE is updated from 03 to 04 and the maximum stored record number M is updated from 03 to 04 in response to the addition of a vertical line record in the location of record number 04. Subsequently, when another horizontal line record is added to the location with record number 05, the vertical line tail record number RE in the control table which is the last record number for the horizontal line record, i.e. 01 in this case, is set as the former record number FR. The next record number BR is set to the initial value FF, and the next record number BR for the record with record number 01 which is the preceding record is updated from FF to 05. For the control table, the horizontal line tail record number RE is updated from 01 to 05 and the maximum stored record number M is updated from 04 to 05 in response to the addition of the horizontal line record.

In short, when a line record is to be added, it is stored in the location with a record number (in the data table) next to the maximum stored record number M in the control table, i.e. M+1, and the vertical line tail record number CE, is set to the former record number FR if the additional line is a vertical line or the horizontal line tail record number RE is set to the number FR if the additional line is a horizontal line, and the next record number BR is always initialized to FF. For the record preceding the additional line record, because of the following record newly stored, the record number for the additional record is stored for the next record number BR. The maximum stored record number M, vertical line tail record number CE and horizontal line tail record number RE are also updated in response to the addition of a record.

The cancellation of line records will now be described with reference to FIG. 3 by way of example where vertical lines are to be deleted. When the line cancelling instruction key and vertical line drawing instruction key are pressed simultaneously, the record number Li is set to the vertical line head record number CS in order to search the table for all vertical line records. Then it is checked if the point (x, y) given by the cursor is located on the line of that record number, that is, if the setup record is to be cancelled, and if it is false, another record specified by the next record number BR is examined in the same process. If the record is found to be cancelled, it is checked if the whole line is to be deleted, and if it is true, the deletion process as shown in the example of FIG. 7 is carried out.

Figure 7:
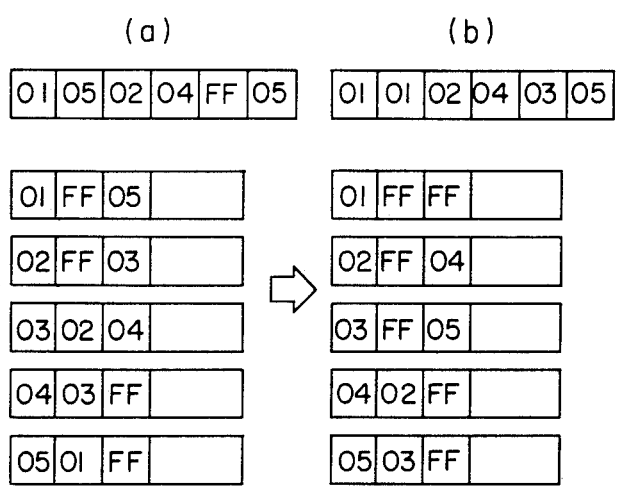

FIG. 7 shows the cancellation of the vertical line record with record number 03 and the horizontal line record with record number 05 out of the records shown in FIG. 6 which have been generated in the foregoing line table generating process. First, when the record with record number 03 has been cancelled, the next record number 03 for the vertical line record with record number 02 which is the preceding record for the cancelled record is updated to 04 which is the next record number of the cancelled record, and the former record number 03 for the vertical line record with record number 04 which is the next record to the cancelled record is updated to 02 which is the former record number 02 of the cancelled record. The record with record number 03 is assumed to be the first cancellation record and its number is set to the cancelled record head number DS in the control table. The former and next record numbers FR and BR for records preceding and following the cancelled record with record number 03 are initialized to FF. Next, when the horizontal line record with record number 05 has been cancelled, the next record number BR for the record preceding the record with record number 01 is updated to have the initial value FF. In this case, the cancelled record is the last vertical line record and, therefore, the vertical line tail record number CE in the control table is updated to have record number 01 for the record preceding the cancelled record with record number 05. The cancelled record with record number 05 is linked to the end of cancelled records by making reference to the cancelled record head number DS in the control table. In this example, the next record number BR for the cancelled record with record number 03 is updated from FF to 05, the former record number for the cancelled record with record number 05 is updated from 01 to 03, and the next record number BR is initialized to FF.

For the line deletion from the start point to the end point, it is carried out by cancelling a corresponding record in the line table. On the other hand, for the line deletion from an intermediate point, it is carried out by altering the end point data EXi and EYi in the data table to the cursor position (x, y).

According to the present invention, as described above, lines can be displayed merely by entering start point information and instructions, whereby the movement of the cursor can be minimized and lines can be displayed in a short operation time.

We claim:

1. A display apparatus comprising a display screen; input means for entering positional information for the starting point of a line to be displayed on said display screen; memory means for storing displayed-line information of lines which have been displayed on the display screen by scanning in a first directional including location of the starting and ending points of lines which have been displayed on said display screen; and processing means including means for determining the location of the ending point of the line to be displayed by scanning in a second direction orthogonal to the first direction in accordance with said positional information entered from said input means and said displayed-line information stored in said memory means, means for generating new line information based on said determination, means for controlling said new line information in said memory means as a part of said displayed-line information in said memory means, and means for causing said display means to display a line on said display screen in accordance with said new line information by scanning in said second direction, said processing means repeating said determination of location of ending point of the line to be displayed, generating new line information, storing new generated information and displaying said new line information for additional lines to be displayed.

2. A display apparatus in accordance with claim 1, wherein said new line information comprises records corresponding to a line which has been displayed, each record comprising indications of the starting and end points of the line which has been displayed, and serial numbers of preceding and next lines which have been displayed preceding to and next to that line, respectively, within those lines belonging to one of predetermined groups of lines classified according to directions in display of the lines.

3. A display apparatus in accordance with claim 1, wherein said lines are displayed selectively in vertical and horizontal directions and said displayed-line information comprises a data table containing line records for each record comprising the start and end points of a corresponding line and serial numbers of preceding and next lines which have been displayed preceding and next to that line, respectively, within those lines displayed in the same direction as the direction of that line, and said control table containing indications of serial numbers of first and last vertical lines which have been displayed first and last in order of display within the vertically displayed lines and serial numbers of first and last horizontal lines which have been displayed first and last in order of display within the horizontally displayed lines.

4. A method of drawing lines for a display apparatus having a display screen, processing means which draws lines on said display screen in accordance with positional information of said lines, and memory means for storing displayed-line information of lines which have been displayed on said display screen, comprising the steps of; storing the displayed-line information including a starting point and an ending point of any line, which has been displayed on said display screen by scanning in a first direction, in said memory means; entering positional information for a starting point of a line to be displayed by scanning in a second direction orthogonal to the first direction; determining the location of an ending point of the line to be displayed based on said entered positional information and said displayed-line information stored in said memory means; generating new line information based on said determination; storing said new line information as a part of said displayed-line information in said memory means; displaying a line on said display screen in accordance with said new line information; and repeating the above steps for additional lines to be displayed.

5. A method of drawing lines for a display apparatus having a display screen, processing means which draws lines on said display screen in accordance with positional information on said lines, and memory means for storing displayed-line information of lines which have been displayed on said display screen, comprising the steps of; storing the displayed-line information including a starting point and an ending point of any line, which has been displayed on said display screen by scanning in a first direction, in said memory means; entering positional information for a starting point of a line to be displayed by scanning in a second direction orthogonal to the first direction; determining the location of an ending point of the line to be displayed based on said entered positional information and said displayed-line information stored in said memory means; generating new line information based on said determination comprising records corresponding to a line which has been displayed, each record including the starting and end points of the line which has been displayed, and serial numbers of preceding and next lines which have been displayed preceding to and next to that line, respectively, within those lines belonging to one of the predetermined groups of lines classified according to directions in display of the lines; storing said new line information as part of said displayed-line information in said memory means; displaying a line on said display screen in accordance with said new line information; and repeating the above steps for additional lines to be displayed.

6. A method of drawing lines for a display apparatus having a display screen in which said lines are displayed selectively in vertical and horizontal directions, processing means which draws lines on said display screen in accordance with positional information of said lines, and memory means for storing displayed-line information of lines which have been displayed on said display screen, said displayed-line information including a data table containing line records for each record comprising the start and end points of a corresponding line and serial numbers of preceding and next lines which have been displayed preceding and next to that line, respectively, within those lines displayed in the same direction as the direction of that line, and said control table containing indications of serial numbers of first and last vertical lines which have been displayed first and last in order of display within the vertically displayed lines and serial numbers of first and last horizontal lines which have been displayed first and last in order of display within the horizontally displayed lines, comprising the steps of; storing the displayed-line information including a starting point and an ending point of any line, which has been displayed on said display screen by scanning in a first direction, in said memory means; entering positional information for a starting point of a line to be displayed by scanning in a second direction orthogonal to the first direction; determining the location of an ending point of the line to be displayed based on said entered positional information and said displayed-line information stored in said memory means; generating new line information based on said determination; storing said new line information as a part of said displayed-line information in said memory means; displaying a line on said display screen in accordance wtih said new line information; and repeating the above steps for additional lines to be displayed.

7. A method of drawing lines for a display apparatus having a display screen, processing means which draws lines on said display screen in accordance with positional information of said lines, and memory means for storing displayed-line information of lines which have been displayed on said display screen, said displayed-line information including serial numbers which are allotted to the displayed lines, respectively, in the order of display, comprising the steps of: storing the displayed-line information including a starting point and an ending point of any line, which has been displayed on said display screen by scanning in a first direction, in said memory means; entering positional information for a starting point of a line to be displayed by scanning in a second direction orthogonal to the first direction; determining the location of an ending point of the line to be displayed based on said entered positional information and said displayed-line information stored in said memory means; generating new line information based on said determination; storing said new line information as a part of said displayed-line information in said memory means; displaying a line on said display screen in accordance with said new line information; and repeating the above steps for additional lines to be displayed.

* * * * *